United States Patent [19]

Walker, Jr.

[11] Patent Number: 4,542,931

[45] Date of Patent: Sep. 24, 1985

[54] TOP OPENING DOOR ASSEMBLY

[75] Inventor: Harold E. Walker, Jr., Meyersdale, Pa.

[73] Assignee: Somerset Welding & Steel, Inc., Somerset, Pa.

[21] Appl. No.: 531,152

[22] Filed: Sep. 9, 1983

[51] Int. Cl.⁴ ............................................. B60P 7/02
[52] U.S. Cl. ................................... 296/100; 296/101; 105/377; 49/115
[58] Field of Search ............... 296/100, 101; 105/377; 160/188, 193; 49/346, 340, 115

[56] References Cited

U.S. PATENT DOCUMENTS

| | | | |
|---|---|---|---|
| 2,397,754 | 4/1946 | Sawyer | 49/346 |
| 3,081,994 | 3/1963 | Martens | 49/340 |
| 4,210,358 | 7/1980 | Sweet et al. | 296/100 |

FOREIGN PATENT DOCUMENTS

| | | | |
|---|---|---|---|
| 729208 | 4/1932 | France | 49/115 |
| 836429 | 6/1960 | United Kingdom | 49/115 |

*Primary Examiner*—Robert R. Song
*Attorney, Agent, or Firm*—King, Liles & Schickli

[57] ABSTRACT

Top closing doors are pivotally mounted on a trailer and are provided with a driving mechanism including a drive cylinder connected by a pin to an endless chain extended in figure-eight fashion around opposed sprockets at the ends of the trailer. The doors are driven by swinging arms connected to the sprockets so as to move in opposite directions during opening and closing and provide full 270° opening movement. The chain includes a master drive link to provide driving stability and an adjustable link passing in guiding relationship to the master link and for providing the required driving tension. The master link is driven by a drive pin connected to a hydraulic cylinder.

13 Claims, 7 Drawing Figures

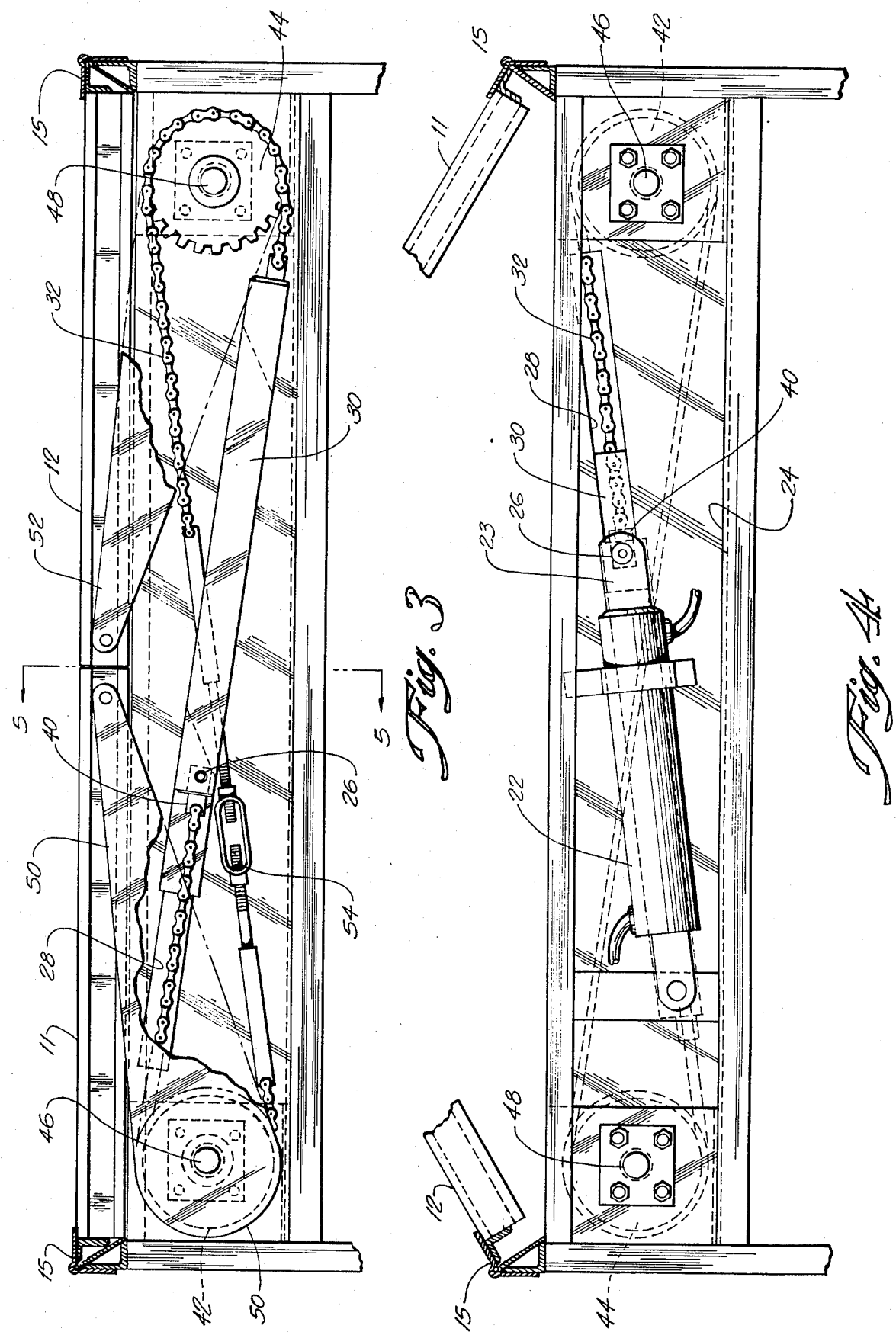

TOP OPENING DOOR ASSEMBLY

BACKGROUND OF THE INVENTION

The present invention relates generally to top opening doors and more particularly to top opening doors for a trailer or the like having a full 270° range of opening movement.

Top opening doors for trailers are well known in the art. U.S. Pat. No. 2,979,361 to Eppinger et al discloses a pair of top covers for a trailer that open over respective sides thereof. When closed, the covers meet along the mid line of the trailer securing the load. The covers, however, are manually operated and very cumbersome. Each cover requires two pivoting connecting links at each end thereof to support their entire weight during movement through 90° from a fully closed to a fully opened position. Further, as disclosed, the covers do not rest upon the box or trailer and thus are not operative to seal the interior of the trailer. Therefore, the covers can allow air to enter the trailer especially at the front, thus causing an increase in internal pressure tending to make the covers lift and fly off. This structural feature makes these prior art covers unsuitable for use on a high speed vehicle.

U.S. Pat. No. 3,854,771 to Anderson is drawn to a one piece cover or door for a trailer top. The door is mounted on roller carriages that roll along the top flanges of the box or trailer. The door may be manually rolled sideways on the roller carriage until it can be tilted downwardly to fully open the top. Often, however, the loading of material leads to matter collecting in the flanges along the top of the trailer, thereby impeding the operation of the door closing function.

U.S. Pat. No. 3,861,737 to Kirkbride discloses a pair of cooperating covers for a trailer top. A chain drive and motor is used to open and close the covers through 90° over respective sides of the trailer. Each cover, however, is carried by a U-shaped carrier having arms at each end. Such an arrangement is unsuitable for modern, extended length trailers for carrying large loads. Also, it is generally recognized that covers of this design would not stand up to rough use without some additional reinforcement of the supporting arms.

A problem common to all of the above prior art is the substantial obstruction created when the doors are open. The doors extend outward from and/or above the trailer creating a hinderance to efficient loading. Additionally, in both Eppinger '361 and Kirkbride '737, separate arms are provided to carry the entire weight of the doors. The lack of additional supporting structure, such as a pivot mounting, leads to inevitable failure of the door opening mechanism when subjected to heavy use. In Anderson, roller carriages are used to support the door. The rollers of these carriages, however, are susceptible to clogging and binding from the dirt and debris associated with the trailer load. Thus, there is a need for top opening trailer doors that do not hender trailer loading when open; and doors of improved durability providing smooth and efficient operation while requiring little or no maintenance.

SUMMARY OF THE INVENTION

Accordingly, it is the primary object of the present invention to provide top opening doors for trailers or the like having an improved structure for increased durability.

Another object of the present invention is to provide top opening doors including an improved drive means for smooth, efficient and reliable operation.

Still another object of the present invention is to provide top opening doors for a trailer or the like having improved sealing capability when closed and improved trailer access so as not to hinder trailer loading when opened.

A further and more specific object of the present invention is to provide top opening doors having a full 270° range of movement about a fixed pivotal mounting to the sides of the trailer in order to impart durability and improve trailer access for loading.

Additional objects, advantages, and other novel features of the invention will be set forth in part in the description that follows and in part will become apparent to those skilled in the art upon examination of the following or may be learned with practice of the invention. The objects and advantages of the invention may be realized and attained by means of the instrumentalities and combinations particularly pointed out in the appended claims.

To achieve the foregoing and other objects in accordance with the purposes of the present invention as described herein, cooperating top opening doors for trailers are provided. Each door is carried by sturdy support arms pivotally mounted at a fixed point to each side of the trailer. The pair of doors cooperate with each other so as to completely cover and seal the top of the trailer when closed. Since the mounting is a simple, fixed pivot arrangement, the doors are highly reliable in operation and very rugged for a long, generally maintenance free, service life. The mounting assures superior structural integrity and improved durability for the doors rendering them an ideal choice for heavy duty trailers, such as to haul bulk garbage and refuse to land fills or other points of disposal.

Drive means are provided for actuating the arms to move the doors a full 270° between a fully opened and fully closed position. The drive means provides smooth and efficient actuation of each arm allowing doors of greater span to be used than possible in the past. The arms securely hold the doors against jarring motion that can cause structural stress in the doors and damage to the drive mechanism. Additionally, the drive means being directly connected to the pivoting arms assures that the doors are firmly and properly seated when closed, thus sealing the doors to the extent necessary to prevent the tendency to lift up during high speed travel. The positive drive during the closing mode also prevents slamming and the associated damage to the doors and trailer caused thereby.

The preferred drive means includes an endless chain and a drive motor. The endless chain extends in figure-eight fashion over first and second opposing guide sprockets so as to drive the doors in opposite directions over the respective sides to which they are permanently pivotally mounted. The guide sprockets are mounted on shafts connected to the support arms adjacent the sides at the end of the trailer.

The endless chain includes a master drive link providing stable driving action to the doors. The master drive link includes a pair of spaced, cooperating straps forming a channel to receive the intersecting run of the drive chain. The drive link guides the endless chain during opening and closing of the doors to insure maximum efficiency and reliability in operation. The drive link may be connected to a drive cylinder by means of a drive pin. The cylinder is positioned adjacent to and in alignment with the master link of the endless chain. Upon supplying hydraulic power to actuate the cylinder, the chain moves along the figure-eight path turning the sprockets, and in turn swinging the arms to the doors.

The cylinder may be positioned in a compartment along the interior of the trailer. The drive pin extends through a slot in the trailer end wall to connect the piston rod of the cylinder to the endless chain. The compartment protects the cylinder from dirt and debris serving to extend the service life and improve the reliability of the drive means of the present invention.

To insure proper tensioning of the endless chain over the opposing sprockets, a turnbuckle is provided connecting ends of the chain together so as to become a link thereof. The turnbuckle is preferably the portion of the chain extending in guiding relationship between the straps of the drive link.

In order to maximize efficiency, reliability and durability of the invention, a separate drive means as described above is provided at each end of the two doors of the trailer, thereby controlling the doors from opposite ends thereof to further insure proper positioning and sealing when closed. Additionally, by driving and controlling both ends of the pivoting doors, the span can be increased to a maximum without incurring problems of stress concentration.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawing and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention.

In the drawings:

FIG. 3 is a partially brokenaway and sectional view of the drive means of the present invention looking from the outside of the trailer with the doors in the closed position;

FIG. 4 is a partially brokenaway and sectional view of the drive means of the present invention looking from the inside of the trailer with the doors in a partially opened position;

Reference will now be made in detail to the present preferred embodiment of the invention, an example of which is illustrated in the accompanying drawing.

DETAILED DESCRIPTION OF THE INVENTION

Figure 1:
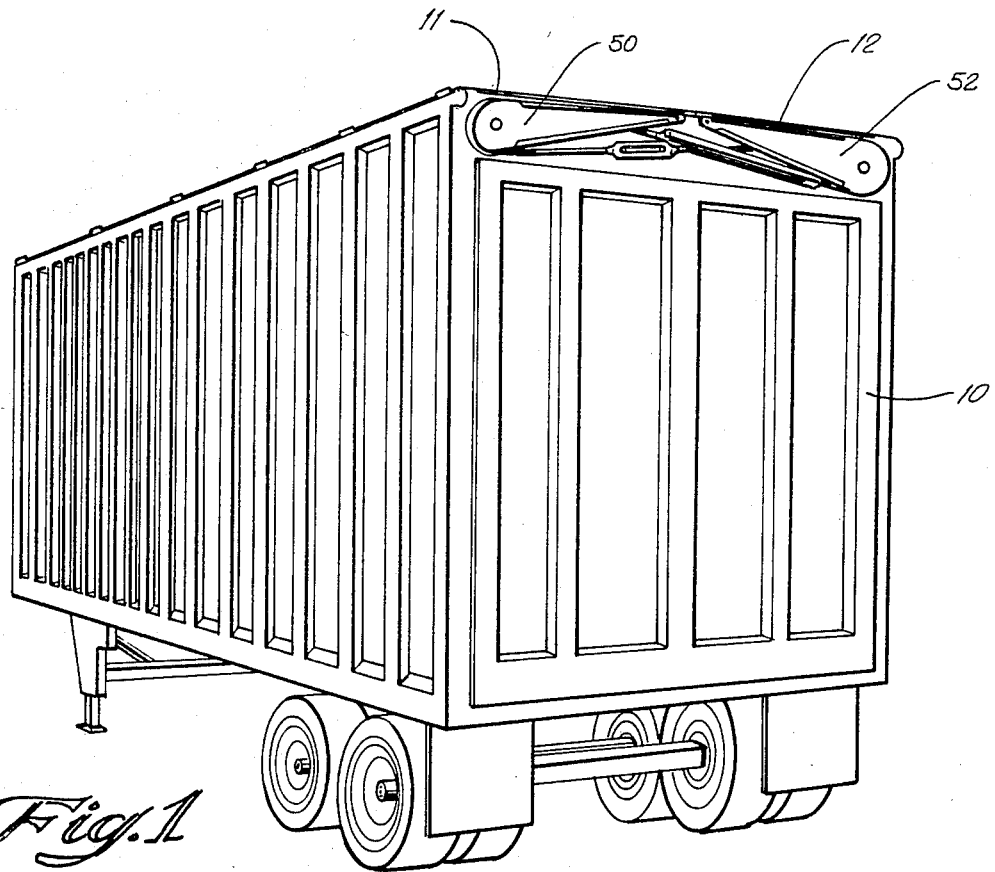
FIG. 1 is a perspective view of a truck trailer including the top opening doors of the present invention in the fully closed position.

Reference is now made to FIG. 1 showing a truck trailer 10 fitted with the top opening doors of the present invention. The doors 11, 12 seal against the top edge of the trailer walls, that is fit snugly across the top of the trailer 10 when closed. This prevents wind from collecting under the doors 11, 12 and forcing them open when the trailer is in transit.

Figure 2:
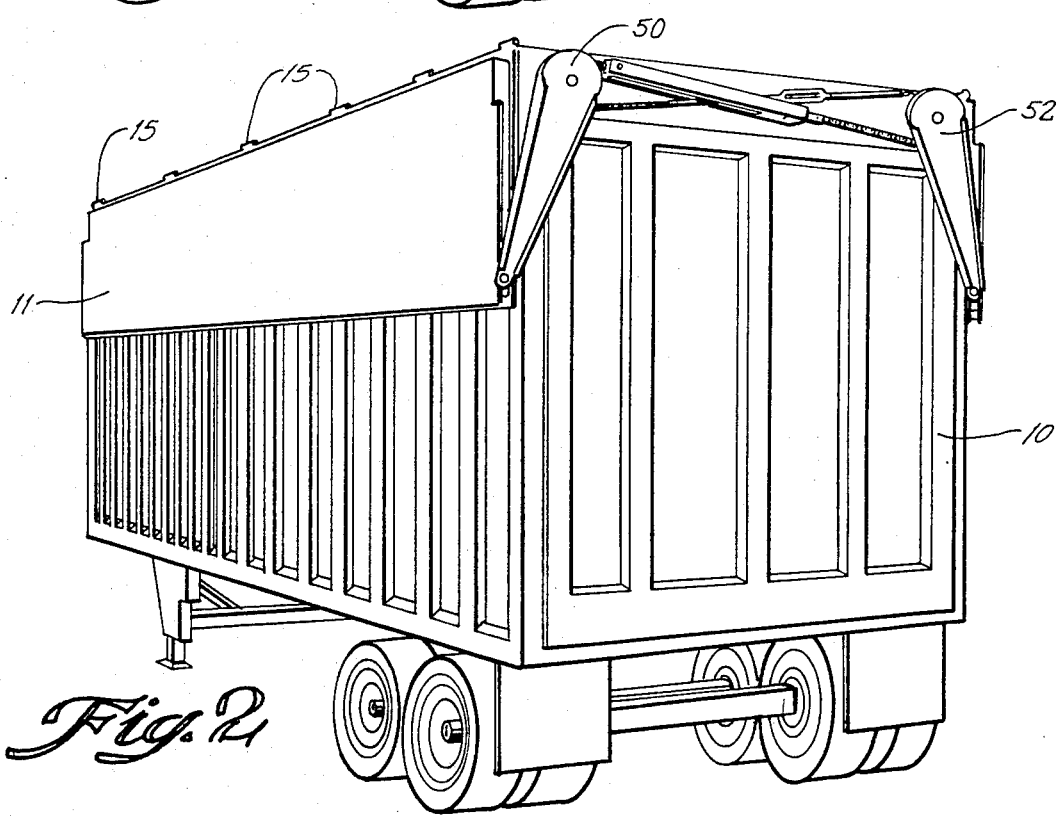
FIG. 2 is another perspective view of a truck trailer including the top opening doors of the present invention in the fully opened position.

As shown in FIG. 2, the doors 11, 12 of the present invention may be placed in a fully opened position downwardly along and in contact with the sides of the trailer 10. In this position, the doors 11, 12 neither extend outwardly from nor upwardly above the sides of the trailer 10. Thus, when opened, the doors 11, 12 of the present invention in no way hinder the loading of the trailer 10. The doors 11, 12 must travel through a full 270° of rotation about a permanent pivotal mounting along the upper portions of the sides of the trailer to provide this fully opened position. As shown, this fixed pivotal mounting is by means of hinges 15 welded at spaced intervals to the doors 11, 12 and the trailer 10. It should be recognized, however, that other means providing a secure pivotal mounting could be used. The permanent pivotal mounting of the doors 11, 12 to the trailer 10, however, does provide improved structural integrity and durability as the weight of the doors is supported along a relatively wide span. Thus, operation is far more realiable and there is far less chance of door twisting or flexing than in the prior art.

Figure 5:
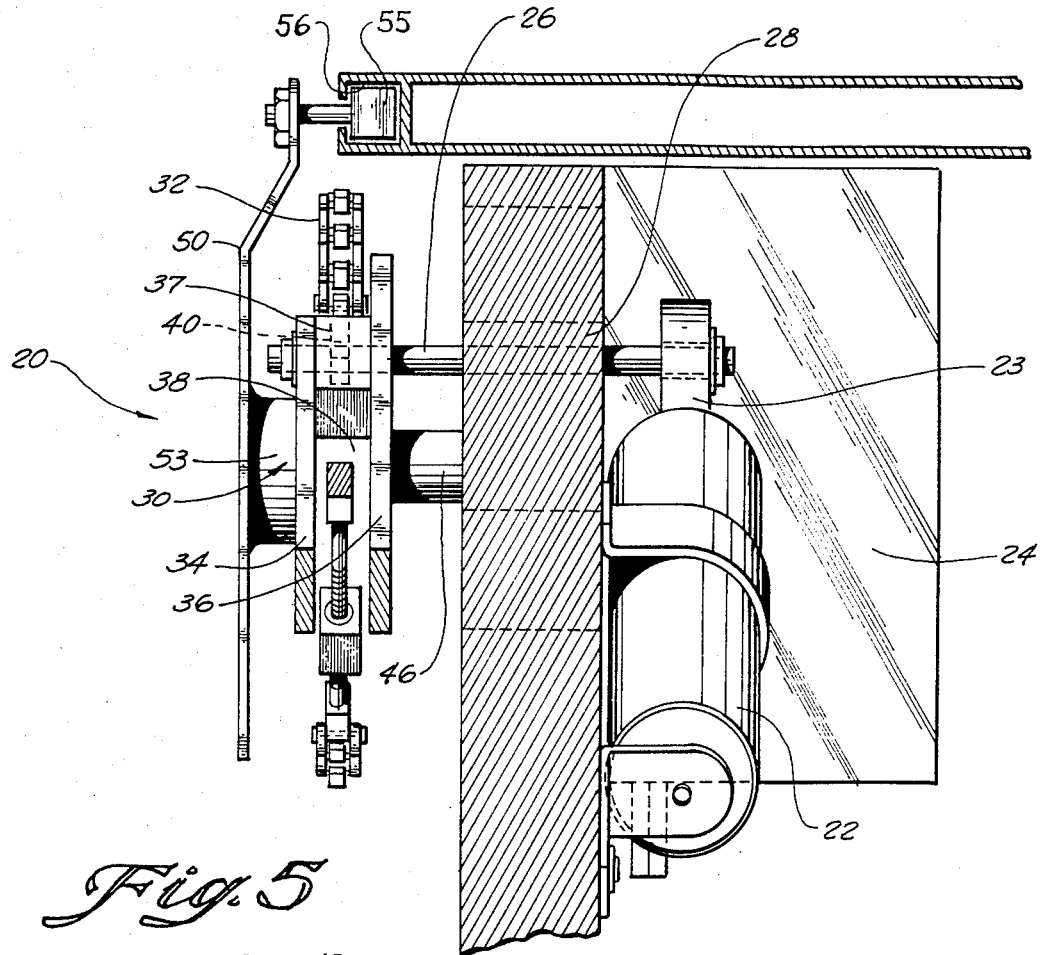
FIG. 5 is a cross-sectional view of the drive means of the present invention along line 5—5 of FIG. 3.

As may be appreciated from viewing FIGS. 3-5 in combination, movement of the doors is controlled by drive means generally designated by reference numeral 20. The drive means 20 includes a drive motor, such as a hydraulic cylinder 22, for powering the doors 11, 12 between the fully opened and fully closed positions. As shown in FIG. 5, the cylinder 22 is positioned along the inside of the end wall of the trailer 10. Preferably, the cylinder 22 is positioned within a compartment 24 where it is protected from dirt and debris thereby increasing the service life and lowering the maintenance costs of the operating system.

A drive pin 26 passes through a slot 28 in trailer 10 to connect the piston rod 23 of cylinder 22 to a master drive link 30 in endless chain 32. The master drive link 30 includes two straps 34, 36 spaced apart by means of spacers 37. The straps 34, 36 cooperate to form a channel 38 therebetween. A connecting bar 40 is provided between the straps 34, 36 at each end thereof to connect the endless chain 32 to the master drive link 30. The master drive link 30 functions to provide smooth, stable driving action to the doors 11, 12 by guiding the endless chain 32 during opening and closing movement.

As best seen from viewing FIGS. 3 and 4, the endless chain 32 extends in figure-eight fashion over opposing drive sprockets 42, 44. The sprockets are rotatably mounted on respective stub shafts 46, 48 adjacent the upper corners of the end of the trailer 10. Drive arms 50, 52 are carried on hubs 53 of the sprockets 42, 44. The arms 50, 52 have a roller 55 secured to the distal end, with the roller 55 engaging a track 56 along the adjacent edge of the door 11, 12 (see FIG. 5). As the arm 50, 52 swings on its shaft 46, 48, the roller 55 moves up and down the track 56 providing the desired 270° movement to the doors 11, 12.

In order to provide means for adjusting the tension of the endless chain 32 over the sprockets 42, 44, a turnbuckle 54 is provided as a link along the run of the chain crossing the master link 30. Rotating the nut of the turnbuckle 54 in a first direction increases the length of the chain 32 and decreases the tension. Similarly, rotation in the opposite direction decreases the length of the chain 32 and increases the tension.

As can be particularly appreciated from viewing FIG. 3, the master drive link 30 and turnbuckle link 54 cross between the sprockets 42, 44. The master drive link 30 extends from sprocket 44 upwardly to sprocket 42, and turnbuckle link 54 extends between the straps 34, 36 of link 30 upwardly from sprocket 42 to sprocket 44.

The crossing of these links 30, 52 in this manner provide guiding action for the chain 32 and smooth, stable, driving operation is assured.

It should be appreciated that for best results, one of the above described drive means 20 is included at each end of the trailer 10. The doors 11, 12 are thus provided with equal driving force at each end. Since the doors 11, 12 are thus positively driven and guided at each end, proper seating on the trailer ends and sides is virtually assured.

Figure 7:
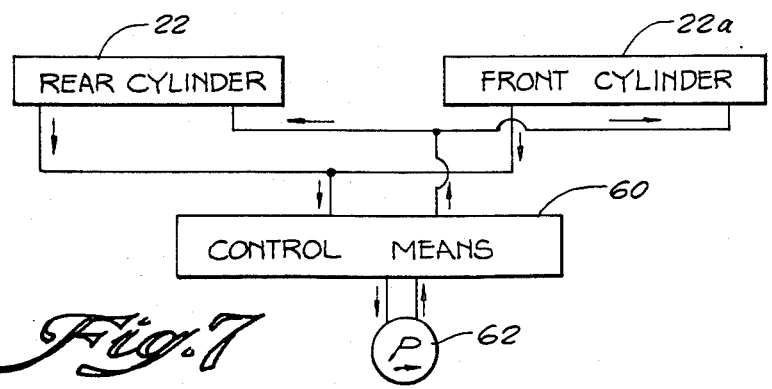
FIG. 7 is a schematic diagram of the hydraulic circuit of the present invention.

The top opening doors of the present invention are particularly easy to operate. When the doors 11, 12 are closed as in FIGS. 1 and 3, the operator actuates the control means 60, such as a directional control valve, providing flow of hydraulic fluid from pump 62 to front and rear cylinders 22, 22a (see FIG. 7). As the fluid pressure builds in the cylinders, the cooperating piston rods 23 extend to advance the endless chain 32 via the pin 26 and master drive link 30. The movement of the endless chain 32 causes sprocket 42 to rotate counterclockwise about shaft 46 and guide sprocket 44 to rotate clockwise about shaft 48, as viewed in FIG. 3. The arms 50, 52 connecting the sprockets 42, 44 to doors 11, 12 respectively, cause the doors to be driven in opposite directions simultaneously into the open position.

Figure 6:
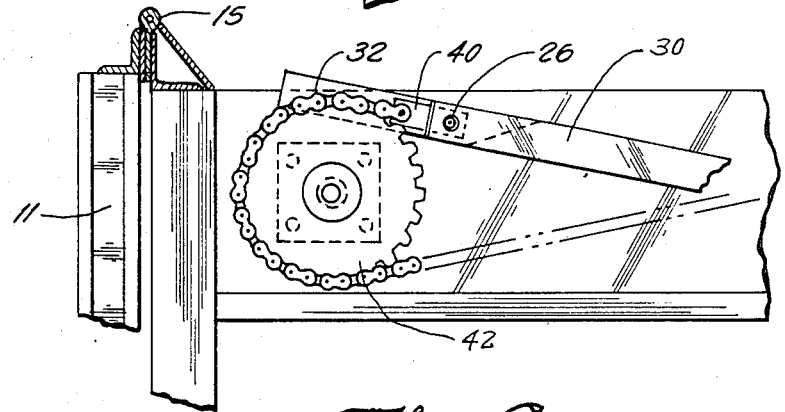
FIG. 6 is a fragmentary view of the drive means of the present invention showing the relationship of the master drive link of the endless chain and one of the guide sprockets when the doors are in the fully opened position.

As shown in FIG. 6, when the doors 11, 12 are fully opened, the pin 26, connecting piston rod 23 with drive link 30, is nearly in contact with guide sprocket 42 at one extreme end of slot 28. This proximity of pin 26 to the sprocket 42 maximizes the stabilizing effect of the rigid master drive link 30 on the final driving action of the doors 11, 12 adjacent the full open position.

When the doors 11, 12 are to be closed, the operator again actuates control means 60 providing flow of hydraulic fluid back from the cylinders 22, 22a to the pump 62. The piston rod 23 then retreats back into the cylinder 22. This causes endless chain 32 to advance so as to rotate sprocket 42 clockwise and sprocket 44 counterclockwise (FIG. 3). The arms 50, 52 connected to the sprockets 42, 44 and secured for movement with the doors 11, 12 by the rollers 55 in the track 56 cause the doors to close.

In summary, numerous benefits have been described which result from employing the concepts of this invention. Completely unobstructed access for loading the trailer is provided by the full 270° range of movement available with the top opening doors of the present invention. The fixed pivotal mounting of the doors to the sides of the trailer and pivoting arm actuation at both ends insure improved structural integrity and durability. Additionally, the drive means 20 including a figure-eight chain 32 provides a smooth, stable operation.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interrpreted in accordance with the breadth to which they are fairly, legally and equitably entitled.

I claim:

1. Top opening doors for a trailer or the like comprising:
    a first and second door pivotally mounted to each side of said trailer so as to cover the top of said trailer when closed; and
    positive drive means connected to said doors including an endless chain, a master drive link for stable driving action and a drive motor connected to said chain for actuating said doors in a controlled manner about a full 270° of movement between a fully opened and fully closed position; said endless chain including means for adjusting the tension of said chain, said adjusting means forming a link of the chain and crossing in guiding relationship between spaced straps of said master drive link.

2. The top opening doors disclosed in claim 1, wherein said endless chain of said means extend in figure-eight fashion over first and second opposing sprockets rotatably mounted on shafts adjacent an end of said trailer.

3. The top opening doors disclosed in claim 2, wherein said drive means further comprises a first and second arm, said first arm connecting said first guide sprocket to said first door and said second arm connecting said second guide sprocket to said second door so as to drive said doors in opposite directions.

4. The top opening doors disclosed in claim 3, wherein said arms each include a roller mounted for sliding action along a track on the adjacent edge of the door.

5. The top opening doors disclosed in claim 1, wherein said drive means includes a chain and motor at each end of said trailer.

6. Top opening doors for a trailer or the like comprising:
    a first and second door pivotally mounted to each side of said trailer so as to cover the top of said trailer when closed; and
    drive means connected to said doors including an endless chain, a master drive link for stable driving action and a drive motor connected to said chain for actuating said doors about a full 270° of movement between a fully opened and fully closed position; said drive motor including a cylinder positioned adjacent to and substantially in alignment with said endless chain and connected thereto by connecting means.

7. The top opening doors disclosed in claim 6, wherein said connecting means is connected to said chain at said master drive link.

8. The top opening doors disclosed in claim 7, wherein said cylinder is mounted in a compartment along an inside surface of said end of said trailer and said connecting means is a pin that extends through a slot in said end to connect said cylinder to said endless chain.

9. Top opening doors for a trailer, comprising:
a pair of doors, one door being pivotally mounted to each side of said trailer so as to cover the top of said trailer when closed;
a pair of opposing sprockets rotatably mounted on shafts at each end of said trailer;
an endless chain extending in figure-eight fashion over each pair of opposing sprockets at each end of said trailer;
arms connecting each of said sprockets to one of said doors so that one sprocket at each end of said trailer is connected to each door; and
a drive motor at each end of said trailer connected to the associated endless chain so as to positively drive said doors 270° in a controlled manner between a fully opened and fully closed position; said drive motor including a cylinder adjacent to and substantially in alignment with said endless chain and connected thereto by connecting means.

10. The top opening doors disclosed in claim 9, wherein said connecting means is connected to a master drive link of said endless chain.

11. The top opening doors disclosed in claim 10, wherein said master drive link comprises a pair of spaced cooperating straps forming a channel therebetween for guiding said endless chain during opening and closing of said doors.

12. The top opening doors disclosed in claim 11, wherein said chain further comprises means for adjusting the length of said chain.

13. The top opening doors disclosed in claim 12, wherein said adjusting means is a turnbuckle forming a link of said chain and passing between said straps.

* * * * *